Nov. 25, 1924.
J. L. THEOBALD
1,516,799
DEMOUNTABLE WHEEL LOCKING DEVICE
Filed Jan. 9, 1922
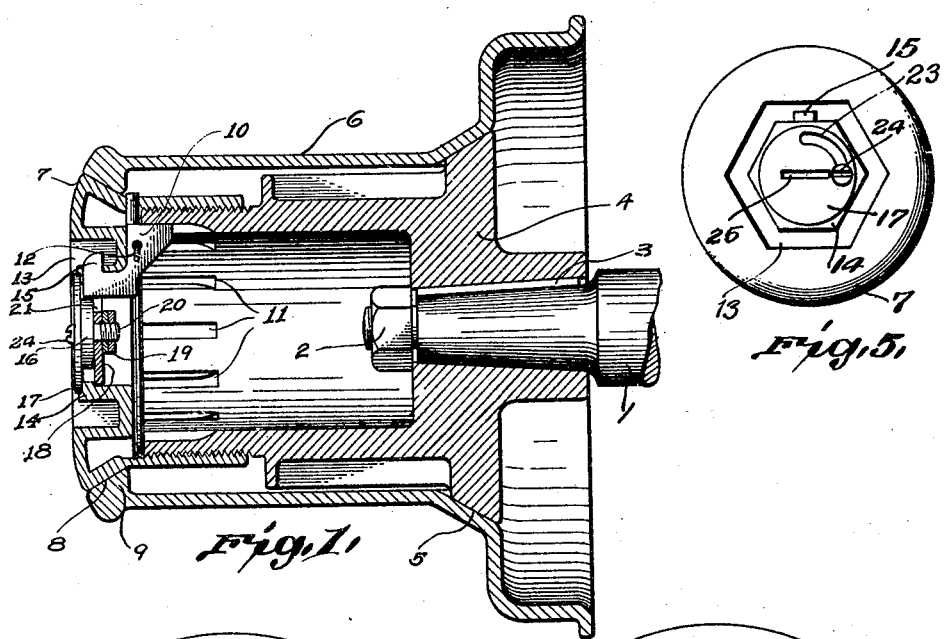
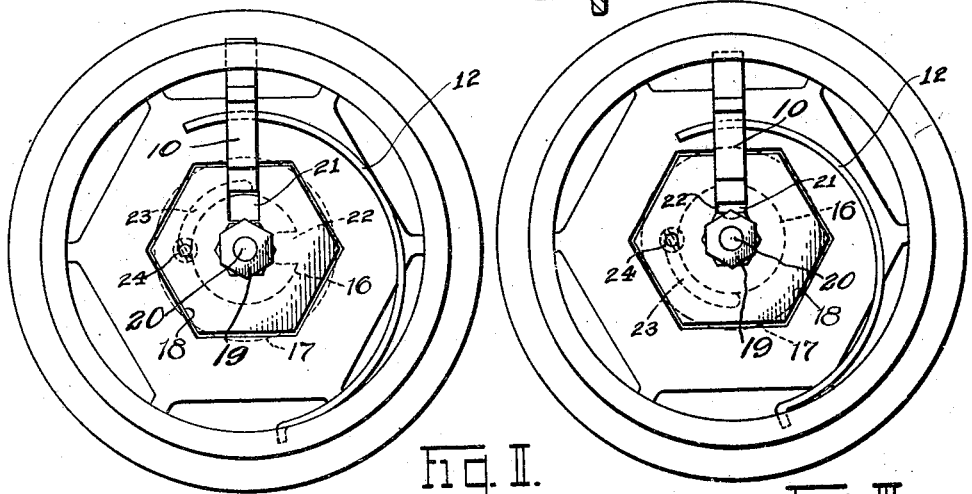
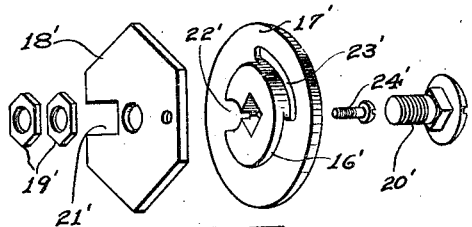
Inventor
JOHN L. THEOBALD.
By *C. W. Marshall*
Attorney Patented Nov. 25, 1924.

1,516,799

UNITED STATES PATENT OFFICE.

JOHN L. THEOBALD, OF STENTON, PENNSYLVANIA.

DEMOUNTABLE-WHEEL-LOCKING DEVICE.

Application filed January 9, 1922. Serial No. 528,073.

*To all whom it may concern:*

Be it known that I, JOHN L. THEOBALD, a citizen of the United States, residing at Stenton, in the county of Philadelphia and State of Pennsylvania, have invented certain new and useful Improvements in Demountable-Wheel-Locking Devices, of which the following is a specification.

This invention relates to hubs for demountable wheels, and particularly to means for locking the parts against movement and thereby preventing the wheel from accidentally becoming loose or coming off, and its principal object is to provide a locking device which is simple and reliable and which may be easily applied to demountable wheel hubs of existing types.

Other objects and advantages will be apparent from the following description, in which reference is had to the accompanying drawings illustrating preferred embodiments of my invention and in which similar reference numerals designate similar parts throughout the several views.

In the drawings:—

Figure 1 is a vertical sectional view taken on a plane passing through the center of a wheel hub which is equipped with a locking device of my invention;

Figure 2 is an enlarged elevational view showing the interior of a hub cap equipped with a locking device of my invention, the parts being shown in "locked" position;

Figure 3 is a similar view showing the interior of the hub cap, with the parts in "unlocked" position; and Figure 4 is a perspective view showing some of the essential parts of a slightly modified form of device in disassembled relation.

Figure 5 is an elevational view of the outer face of the hub cap.

For purposes of illustration I have shown my invention as applied to a demountable wheel hub of a type well known in the art, but it is to be understood that the invention is also applicable to demountable wheel hubs of other types.

In the illustrative form shown the hub is driven by a live axle 1 which is secured by means of a nut 2 and a key 3 to the core or non-removable member 4 of the hub. This non-removable member is provided at its inner end with a tapered non-circular seat 5 which forms a driving connection between the non-removable member 4 of the hub and the removable member 6 thereof, which consists of a sleeve that surrounds the non-removable member.

The removable member or sleeve 6 is held in place upon the core 4 by means of a hub cap 7 which extends into the outer end of the removable sleeve 6 and is threaded onto the outer end of the core 4. The outer end of the hub cap is expanded to form a tapered seat 8 which engages the similarly depressed interior periphery of an inwardly extending flange 9 formed upon the outer end of the removable sleeve. It will be apparent from an inspection of Figure 1 that when the hub cap is turned up upon the core 4 the removable hub member is forced into rigid concentric relation therewith but that owing to the tapered formation of the seats 5 and 8 which are engaged by the removable sleeve 6 the parts may be readily disengaged when the hub cap 7 is unscrewed. It will also be apparent that any accidental unscrewing or backing off of the hub cap 7 would at once loosen the removable sleeve. The rolling motion which would thus be permitted between the flange 9 and the expanded portion 8 of the hub cap 7 would in some cases result in further backing off of the hub cap, so that there would be danger of the wheel's coming entirely off. In order to prevent such accidental unscrewing of the hub cap it is provided with a spring-pressed detent 10 which is engageable with a series of notches 11 formed upon the interior of the core, the detent 10 being urged outwardly into engagement with the notches 11 by a spring 12.

Formed within a polysided depression 13 in the outer end of the hub cap 7 is a polysided boss 14 adapted to be engaged by a wrench. The detent 10 is provided with a projection 15 which extends outwardly through the boss 14 into the depression 13 so that it is engaged by the wrench and forced inwardly when the wrench is placed upon the boss 14. The detent 10 is thus disengaged from the notches 11 when the wrench is placed upon the boss and the hub cap may, therefore, be turned by the wrench without interference.

Where spring-pressed detents of the character above described are used to prevent hub caps from accidentally unscrewing or backing off, it has been found in practice that owing to the shocks to which the wheel is subjected while in motion, the detent is frequently jarred out of engagement with the notches and the hub cap on such occasions sometimes turns sufficiently so that the detent does not reseat in a notch. The demountable wheel is thereby permitted to become loose upon the inner member or core of the hub, and it has sometimes happened that wheels of this type have left the inner member entirely, with disastrous results.

In the device of my invention the detent is prevented from accidentally jolting out of engagement with the notches 11 by means of a circular stop 16 which fits within an opening in the boss 14 and projects inwardly into the path of the detent, as shown in Figure 1. Formed upon the stop 16 is a radially extending flange 17 which lies within a shallow counterbore or rabbet in the end of the boss 14 and the stop is held in place by this flange and a polysided plate 18 which lies against the inner side of the end of the boss 14 and is secured by means of nuts 19 to a threaded shank 20 projecting inwardly from the center of the stop 16. The threaded shank in the form of device shown in Figure 1 is integral with the stop 16. The clamping nuts 19 are turned up sufficiently close to the plate 18 to reliably hold the stop 16 in place, but are not clamped so tightly against the plate that the stop 16 is prevented from turning.

The plate 18 is provided with a notch 21 which receives the detent 10 and is of sufficient depth to permit the detent to be moved inwardly until it is disengaged from the notches 11. A notch 22, of sufficient width to receive the detent 10, is cut into the side of the stop 16. When the stop 16 is turned to the position shown in Figures 1 and 2, so that the notches 21 and 22 are out of registration, the detent 10 cannot move inwardly and thus become disengaged from the notches, but when the stop is turned to the position shown in Figure 3, so the notches 21 and 22 are in registration, the detent 10 may move inwardly against the tension of the spring 12 and thereby become disengaged from the notches.

An arcuate slot 23 is cut in the flange 17 and a screw 24 is passed through the slot 23 and threaded into the plate 18. This screw performs a double function—viz, when loose it constitutes a means for limiting the turning movement of the stop 16 to about one-fourth of a revolution, and when tightened it forms a clamping device to prevent the stop from turning accidentally. A kerf 25 adapted to be engaged by a screw driver is cut in the outerface of the stop 16.

When it is desired to demount the wheel the screw 24 is loosened. The stop 16 is then turned, by means of a screw driver or other instrument adapted to co-operate with the kerf 25, to the position shown in Figure 3. A wrench is then passed inwardly over the boss 14 so that it engages the projection 15 and forces the detent 10 inwardly against the tension of the spring 12. The hub cap is then unscrewed or backed off by means of the wrench, and the removable sleeve 6 which carries the wheel body is withdrawn from the core 4.

When it is desired to remount the wheel, the sleeve 6 is passed over the core 4, the hub cap 7 is turned up upon the core until the removable sleeve is forced into the position shown in Figure 1, the wrench is withdrawn from the boss 14, and the detent 10 is moved outwardly into engagement with one of the notches 11. Should the detent strike the inner surface of the core between two of the notches, the hub cap is turned further until it is in such position that the detent moves into one of the notches when the wrench is withdrawn from the boss 14. The stop 16 is then turned to the position shown in Figures 1 and 2 and the screw 24 is tightened up. The parts are thereby securely locked in assembled relation and there is no danger of the sleeve 6 becoming loose from the core 4 or of the wheel coming off.

The plate 18' and stop 16' with its flange 17' shown in the modified form illustrated in Figure 4 may be formed by punching and stamping operations. In this form of the device the nuts 19', notches 21' and 22', and the slot 23' and screw 24' are shaped exactly like those above described. The stop 16' is, however, provided with a square opening which receives the square shoulder on the bolt 20'. When the bolt is passed through the square opening in the stop 16' and the round opening in the plate 18', and the nuts 19' are threaded upon the bolt, the parts co-operate in the same way as those illustrated in Figure 1 and described above.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a hub cap adapted to be turned onto and off from a hub member, a spring-pressed detent adapted to prevent turning movement of said hub cap relative to said hub member, and a locking device for said detent, including a substantially circular rotatable stop having an opening in its periphery adapted to be moved into the path of movement of said detent.

2. In a device of the class described, in combination, a hub cap adapted to be turned onto and off of a hub member, a spring-pressed detent adapted to prevent movement of said cap relative to said hub member, and a locking device for said detent, including a plate having a notch in which said detent is adapted to move, and a stop having a notch adapted to be brought into registration with the notch in said plate.

3. In a device of the class described, in combination, a hub cap adapted to be turned onto and off of a hub member, a spring-pressed detent adapted to prevent movement of said cap relative to said hub member, and a locking device for said detent, including a plate having a notch in which said detent is adapted to move, a stop having a notch adapted to be brought into registration with the notch in said plate, and means for locking said stop relative to said plate with said notches out of registration.

4. In a device of the class described, in combination, a hub cap adapted to be turned onto and off of a hub member, a spring-pressed detent adapted to prevent movement of said cap relative to said hub member, and a locking device for said detent, including a plate having a notch in which said detent is adapted to move, and a circular stop rotatably connected to said plate and having a notch adapted to be brought into registration with the notch in said plate.

5. In a device of the class described, in combination, a hub cap adapted to be turned onto and off of a hub member, a spring-pressed detent adapted to prevent movement of said cap relative to said hub member, and a locking device for said detent, including a plate having a notch in which said detent is adapted to move, a circular stop rotatably connected to said plate and having a notch adapted to be brought into registration with the notch in said plate, and means for locking said stop relative to said plate with said notches out of registration.

6. In a device of the class described, in combination, a hub cap adapted to be turned onto and off of a hub member, a spring-pressed detent adapted to prevent movement of said cap relative to said hub member, and a locking device for said detent, including a plate having a notch in which said detent is adapted to move, and a circular stop rotatably connected to said plate and having a notch adapted to be brought into registration with the notch in said plate, said stop having an arcuate slot and a clamping screw passing through said arcuate slot and threaded into said plate.

JOHN L. THEOBALD.

Witnesses:
H. O. ERNSBERGER,
FRANCES DOYLE.